Feb. 22, 1949.　　　G. H. FLETCHER　　　2,462,624
VOLTAGE REGULATING SYSTEM
Filed May 18, 1945
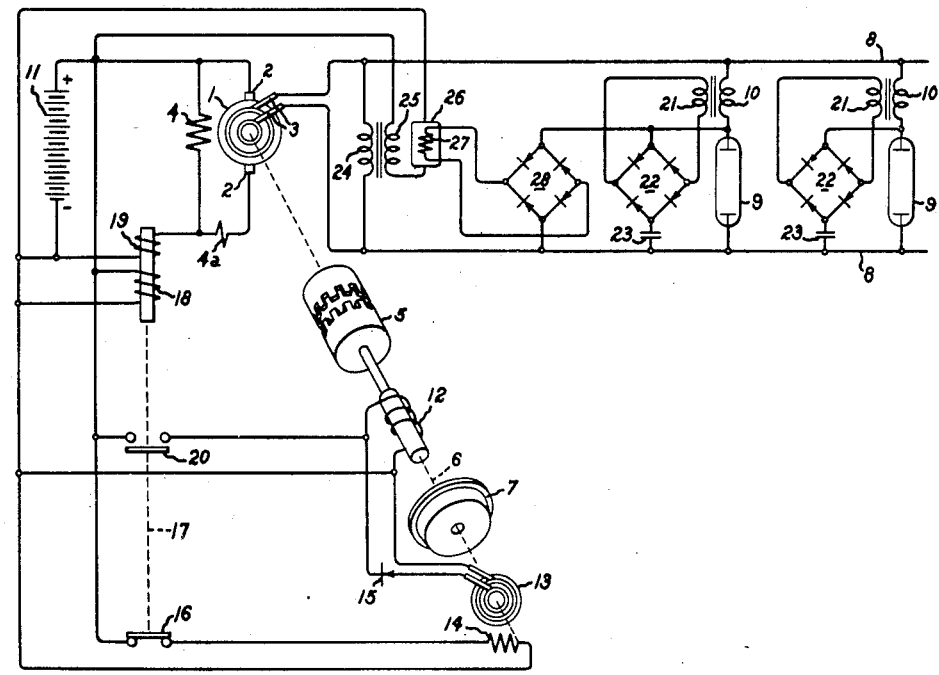
Inventor:
George H. Fletcher,
by　*Harry E. Dunham*
His Attorney.

Patented Feb. 22, 1949

2,462,624

UNITED STATES PATENT OFFICE 2,462,624

VOLTAGE REGULATING SYSTEM

George H. Fletcher, Sheffield, England, assignor, by mesne assignments, to General Electric Company, a corporation of New York Application May 18, 1945, Serial No. 594,397
In Great Britain June 29, 1944

24 Claims. (Cl. 171—97)

My invention relates to voltage regulating systems for variable speed dynamoelectric machines and, particularly, to axle or engine driven alternating current supply systems for vehicle lighting and the like. The invention is especially applicable to fluorescent lighting and alternating current auxiliary supply systems for trains, but is applicable also to other vehicles and, especially, self-propelled vehicles, such as busses, trolley busses, and the like.

Currently, there is a trend to replace incandescent electric lighting by fluorescent lighting in view of the many advantages offered by the latter. For most general purposes, fluorescent lighting systems operating on alternating current at about 100 volts are found to be the most suitable, while relatively high frequency is preferable with a view to minimizing the flicker effects and reduction in weight of choke coil condensers and similar devices involved in fluorescent lighting equipment.

For vehicle lighting, it has heretofore been common to employ a battery to supply current to the lamps during such times as the vehicle is stationary or operating at relatively low speeds, whereas, at the higher speeds, the lighting current and current for charging the battery is furnished by a direct current generator driven by the vehicle and usually coupled to a wheel axle.

The adaptation of fluorescent lighting to steam driven trains, motor busses, and also to electric trains and trolley busses where it is desired to take power from a wheel axle and battery rather than from the line, involves appreciable modification of currently used electric lighting sets, particularly as regards the supply generators. It is possible to employ a single high frequency alternator connected to be driven by the vehicle for supplying power to the lamp during such time as the vehicle is operating at speeds in excess of a predetermined speed, the power for the lamps being furnished at low speed and standstill by a storage battery whose charging current is supplied to the alternator through a rectifying system or by means of a separate direct current generator specifically provided for the purpose. There is then the problem of providing means for converting the direct current at relatively low voltage available in the storage battery to the relatively high voltage and frequency desirable for the supply to the fluorescent lamps. This involves additional apparatus in the form of a rotating machine or an oscillating valve.

It is a general object of my invention to provide a new and improved regulating system for a variable speed alternating current dynamoelectric machine which involves a minimum of equipment and is simple, economical and reliable in operation.

It is a further object of the invention to provide a new and improved battery charging and alternating current supply system for a vehicle which involves a minimum of movable control apparatus, such as electromagnetic voltage regulators, reverse current cut-outs and the like.

It is a still further object of the invention to provide a new and improved alternative battery and axle driving system for a variable speed alternating current vehicle generator.

It is a still further object of my invention to provide new and improved voltage regulating means for an axle driven battery charging and alternating current supply system.

It is still another object of my invention to provide frequency responsive compensating means for maintaining substantially constant the voltage at the terminals of a fluorescent lamp.

Briefly, my invention comprises a dynamoelectric machine, such as a rotary converter or motor-generator set, arranged to supply both alternating current at the requisite voltage and frequency for fluorescent lighting and direct current at the requisite voltage for charging a storage battery at vehicle speeds in excess of a predetermined value, while for lower speeds and at standstill the dynamoelectric machine is arranged to function as a motor alternator, namely, to convert the discharge from the storage battery to alternating current at the relatively high voltage and frequency required for the fluorescent lamps. The direct current side of the dynamoelectric machine is permanently connected in series circuit relation with the storage battery and charging of the battery controlled by mechanically connecting and disconnecting the dynamoelectric machine with the vehicle axle or the like in accordance with battery current and vehicle speed.

In accordance with a further feature of the invention, the voltage across the terminals of each fluorescent lamp is maintained constant independent of alternator frequency by varying the direct current saturation of a series reactor or choke in accordance with lamp voltage.

In accordance with a still further feature of the invention, voltage regulation is effected entirely on the alternating current side of a combined direct and alternating current machine by saturation control of a reactive load in accordance with alternating current output voltage.

My invention will be more fully understood and its objects and advantages further appreciated by referring now to the following detailed specification and drawing, the single figure of which is a schematic circuit diagram of a variable speed alternating current supply system embodying my invention.

Referring now to the drawing, I have shown a combined direct and alternating current dynamoelectric machine 1 having commutator brushes 2 serving as direct current output terminals and slip ring brushes 3 serving as alternating current output terminals. The dynamoelectric machine 1 is provided with a shunt field exciting winding 4 and a differential series field exciting winding 4a, and is arranged for connection through a magnetic clutch 5 to a vehicle axle 6 driven by a vehicle wheel 7.

It will of course be understood that, while it is preferred in practicing my invention to employ a universal dynamoelectric machine 1 having a single wound armature from which both alternating current and direct current are obtained, separate direct current and alternating current machines of conventional type connected by a common shaft may, if desired, be employed.

The alternating current output terminals 3 of the machine 1 are connected directly to a pair of alternating current supply conductors 8 through which alternating current is supplied to a plurality of fluorescent lamps 9, each lamp being connected between the conductors 8 in series with a saturable inductance or choke coil 10.

The direct current output terminals 2 of the dynamoelectric machine 1 are connected in opposing relation to the terminals of a storage battery 11, so that the battery will be charged by the machine 1 when the machine is driven from the car axle, while the machine will be driven as a direct current motor by current supplied from the battery when the mechanical drive is disconnected at the clutch 5. The magnetic clutch 5 is provided with an energizing winding 12 controlled in accordance with both the speed of the vehicle and the direction of current flow in the direct current battery charging circuit.

While any desired form of vehicle speed responsive device may be employed to control the magnetic clutch 5, I prefer to use a variable speed alternator 13 having a field exciting winding 14 energized from the battery 11 and an armature including in its output circuit a rectifier 15 through which direct current having a magnitude proportional to the speed of the vehicle is supplied to the clutch energizing winding 12. The alternator field winding 14 is connected to the battery 11 through a contact 16 of a polarized reverse current relay 17. The relay 17 is provided with a polarizing winding 18 energized from the battery 11 and an actuating winding 19 connected in series circuit relation between the battery and the direct current output terminals of the dynamoelectric machine 1.

In order to prevent discharge of the battery through the machine 1 at low vehicle speeds or standstill, the magnetic clutch 5 is controlled also in accordance with the direction of current in the battery circuit. For this purpose, the clutch energizing winding 12 is arranged to be connected directly to the battery 11 through a contact 20 on the reverse current relay 17. The relay 17 is arranged to be dropped out with the contact 20 open and the contact 16 closed when current in the direct current circuit of the machine 1 is flowing from the battery to the machine, and to be picked up with the contact 20 closed and the contact 16 open when charging current is flowing from the machine to the battery.

It will of course be understood that, while preference is given to a coupling of the magnetic clutch type which can be engaged and disengaged in response to variation of the current in the battery charging circuit, a clutch responsive to a signal, be it electric or otherwise, dependent upon the speed of the driving shaft of the dynamoelectric machine, such as for example through a centrifugally operated device associated with the shaft, may equally well be employed.

For the satisfactory operation of fluorescent lamps it is essential that the applied voltage be kept substantially constant. It is a known characteristic of such lamps, however, that variation of frequency of the supply source has substantially no effect upon the performance of fluorescent lamps. In the present application, it is contemplated that the frequency of the supply source, even at minimum speed, will be of the order of a few hundred cycles per second, so that flicker effect in the lamps will be much less than at, for example, 50 cycles. However, frequency variation of supply voltage is likely to affect the operation of the stabilizing arrangement generally associated with fluorescent lamps. It is not possible to obtain satisfactory voltage stabilization by the use of ordinary choke coils, since the impedance of such choke coils varies with frequency.

Accordingly, therefore, it is a feature of my invention to achieve voltage stabilization in a fluorescent vehicle lighting system independently of the supply frequency by an arrangement in which the choke coil in circuit with each fluorescent lamp is equipped with a saturating winding energized by direct current, so that the inductance of the choke coil varies approximately inversely in proportion to frequency and the inductive reactance is maintained substantially constant. For this purpose, the saturable choke coil 10 connected in series circuit relation with each fluorescent lamp 9 is provided with a direct current saturating winding 21 energized from the output terminals of a rectifier bridge 22, the alternating current input terminals of which are connected across the lamp electrodes in series with a condenser 23. With this arrangement, the direct current excitation of the saturating winding 21 varies less than in proportion to frequency, the inductance of the choke coil 10 varying in inverse proportion to frequency, while the inductive reactance remains substantially constant.

Since, for proper operation of the fluorescent lamps, it is essential that the voltage supplied to each lamp remains constant, and since the dynamoelectric machine operates over a wide range of the speeds, it is desirable that voltage regulating means be provided to control the alternating current output voltage of the machine 1 in such a manner as to maintain the lamp voltage substantially constant. In the case of a universal direct and alternating current machine having series and shunt field windings, as hereinbefore described, it is contemplated that these windings will produce such excitation as is necessary to limit the charging current to the battery. Additional means must therefore be provided for automatically regulating the voltage on the alternating current output side of the machine. For this purpose, I provide a saturable core inductive reactor 24 connected directly across the alternating current output terminals of the machine 1 and having a direct current saturating winding 25 energized from the battery 11 and controlled by a suitable voltage control device 26, which may be a variable resistor or the like. The device 26 includes a direct current regulating winding 27 energized from the output terminals of a full wave rectifier bridge 28, the input terminals of which are connected directly across the terminals of one of the fluorescent lamps 9. With this connection, one fluorescent lamp will be maintained always in action thus to act as a pilot lamp, the voltage across this lamp being automatically maintained constant.

Where no provision is made for stabilization of the fluorescent lamps by direct current saturation of the series reactors 10, the voltage regulation effected by the reactor 24 should respond to the alternating current output voltage of the dynamoelectric machine 1, so that the input terminals of the rectifier bridge 28 would be connected directly between line conductors 8, rather than across the terminals of a fluorescent lamp 9.

In operation, when the vehicle is at standstill or running at low speed, the polarized relay 17 is in the position shown in the drawing, so that the magnetic clutch 5 is disengaged with the battery 11 supplying current to drive the dynamoelectric machine 1 as a motor, the output terminals 3 of the machine 1 supplying alternating current to the lamps 9 through the line conductors 8. If the vehicle is set in motion and its speed is increased to a normal running value, the output voltage of the alternator 13 increases in proportion to the speed. At a predetermined vehicle speed, the output voltage of the alternator 13 is sufficient to effect engagement of the clutch 5 through the energizing winding 12. With the dynamoelectric machine 1 thus driven by the vehicle, its voltage is ordinarily sufficient to supply charging current to the battery 11, so that the current in the direct current circuit reverses, thereby to actuate the polarized relay 17, whereupon the contact 16 is opened and the contact 20 closed. Opening of the contact 16 deenergizes the field winding 14 of the alternator 13, while closure of the contact 20 completes a battery holding circuit for the magnetic clutch energizing winding 12. With the contact 20 closed, discharge of the battery through the armature of the alternator 13 is prevented by the rectifier 15.

At all speeds above that at which the magnetic clutch 5 is engaged by the alternator 13, charging current is supplied to the battery 11 from the direct current side of the dynamoelectric machine 1. With a universal direct and alternating current dynamoelectric machine, such as that shown on the drawing, such an arrangement is facilitated by the fact that the direct current output voltage of the machine is limited by the voltage regulating action of the saturable core reactor 24. The reactance of this reactor is progressively reduced as the speed of the machine 1 increases. Increasing speed tends to raise the alternating current voltage, but, as the alternating current voltage tends to increase, the current through the regulating winding 27 increases and so controls the regulating device 26 as to increase the saturating current through the saturating winding 25. The reactor 24 thus draws a larger reactive current through the common armature of the dynamoelectric machine 1, so that the direct current output voltage of the machine is limited by armature reaction.

It will now be evident that, if for any reason the speed of the vehicle decreases to such an extent that the charging current in the direct current output circuit of the machine 1 decreases to a predetermined minimum value or reverses, the polarized relay 17 will drop out, thereby to disconnect the clutch energizing winding 12 from the battery and disengage the clutch. Under such conditions, the vehicle speed will ordinarily be so low that the output voltage of the alternator 13 is insufficient to reengage the clutch 5.

As hereinbefore mentioned, the inductive reactance of the choke coils 10 is stabilized or rendered substantially independent of the output frequency of the alternating current side of the dynamoelectric machine 1 by controlling the direct current saturation of the coils. Referring now to this circuit, it will be observed that the rectifier bridge 22 is connected in series circuit relation with the inductor 10 and capacitor 23 between the alternating current line conductors 8. Since the rectifier 22 acts as a resistor, this series circuit possesses a broad resonance characteristic having a substantially straight line frequency characteristic on either side of the resonant point. In the form of the invention shown the series circuit 10, 22, 23 is resonant above the frequency range of the machine 1.

If the speed of the machine 1 increases so that the frequency increases, the inductive reactance of the choke coil 10 also tends to increase. However, the increasing frequency causes the capacitive reactance of the capacitor 23 to decrease, and the current through the series circuit 10, 22, 23 to increase. Accordingly, the direct current output of the rectifier bridge 22 is increased, thereby further to saturate the reactor 10 and decrease its inductance. Accordingly, therefore, increasing frequency tends to decrease the inductance of the reactor 10, so that its inductive reactance is maintained substantially constant as desired. It will be evident that, in a similar manner, decreasing frequency tends to increase the inductance of the reactor 10 so that the inductive impedance of the reactor remains substantially constant independent of frequency.

With the frequency variable eliminated by saturation control of the choke coils 10, voltage regulation is facilitated. This regulation is effected by the reactor 24 in direct response to lamp terminal voltage. As explained above in connection with the direct current side of the machine 1, the reactor 24 controls line voltage by controlling the internal voltage drop in the machine 1. On the alternating current side such regulation, responding as it does to lamp voltage, tends to maintain this voltage constant.

Where no provision is made for frequency stabilization of the choke coils 10 and the voltage regulating input to the rectifier bridge 28 is derived directly from the line conductors 8, the voltage across the terminals of the lamp 9 is reasonably stable by reason of the fact that, as the inductive reactance of the reactor 10 increases or decreases directly with frequency, the current through the lamp and reactor decreases or increases, respectively, in accordance therewith because the alternating current line voltage is maintained constant. Thus, the inductive drop through the reactor does not vary greatly because reactance change with frequency is automatically compensated by changing current. Therefore, since the voltage drop across the reactor is relatively stable, and the line voltage is regulated to a constant value, the lamp voltage remains substantially constant. This control, while simpler than the preferred control shown in the drawings, involves undesirable variation in lamp current, and is obviously less exact in that the lamp terminal voltage is controlled only indirectly and not directly, as in the preferred form.

While I have shown and described only certain preferred embodiments of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. A vehicle alternating current supply system comprising a dynamoelectric machine having direct and alternating current output terminals, a battery permanently connected to said direct current terminals alternatively to drive said dynamoelectric machine and to be charged therefrom, clutch means arranged to connect said dynamoelectric machine to be driven by said vehicle, and means responsive to the speed of said vehicle for controlling said clutch means.

2. A vehicle alternating current supply system comprising a dynamoelectric machine having direct and alternating current output terminals, a battery permanently connected to said direct current output terminals alternatively to drive said dynamoelectric apparatus and to be charged therefrom, clutch means arranged to connect said dynamoelectric machine to be driven by said vehicle, and means responsive to an electrical characteristic of the direct current output of said dynamoelectric machine for controlling said clutch means.

3. A vehicle alternating current supply system comprising a dynamoelectric machine having direct and alternating current output terminals, a battery having a charging circuit permanently connected to said direct current output terminals, said battery alternatively supplying current to drive said dynamoelectric machine and being charged therefrom, clutch means arranged to connect said dynamoelectric machine to be driven by said vehicle, and means operable in accordance with a characteristic of the unidirectional current in said charging circuit for controlling said clutch means.

4. A vehicle alternating current supply system comprising a dynamoelectric machine having direct and alternating current output terminals, a battery having a charging circuit permanently connected to said direct current output terminals, said battery alternatively supplying current to drive said dynamoelectric machine and being charged therefrom, clutch means arranged to connect said dynamoelectric machine to be driven by said vehicle, and means responsive to the direction of the unidirectional current in said charging circuit for controlling said clutch means.

5. A vehicle alternating current supply system comprising a dynamoelectric machine having direct and alternating current output terminals, a battery permanently connected to said direct current terminals alternatively to drive said dynamoelectric machine and to be charged therefrom, clutch means arranged to connect said dynamoelectric machine to be driven by said vehicle, means responsive to the speed of said vehicle for engaging said clutch means, and means responsive to a characteristic of the charging current supplied to said battery for maintaining said clutch means engaged.

6. A vehicle alternating current supply system comprising a dynamoelectric machine having direct and alternating current output terminals, a battery having a charging circuit permanently connected to said direct current terminals, said battery alternatively supplying current to drive said dynamoelectric machine and being charged therefrom, clutch means arranged to connect said dynamoelectric machine to be driven by said vehicle, means operable in accordance with a characteristic of current in said charging circuit for controlling said clutch means, said control means maintaining said clutch engaged whenever charging current is flowing from said machine to said battery, and means responsive to the speed of said vehicle for effecting engagement of said clutch means at speeds above a predetermined minimum speed.

7. A vehicle alternating current supply system comprising a dynamoelectric machine having direct and alternating current output terminals, a battery having a charging circuit permanently connected to said direct current terminals, said battery alternatively supplying current to drive said dynamoelectric machine and being charged therefrom, clutch means arranged to connect said dynamoelectric machine to be driven by said vehicle, directional current responsive means associated with said charging circuit for controlling said clutch means, said current responsive means being ineffective to engage said clutch whenever said battery is supplying current to said machine, means responsive to the speed of said vehicle for engaging said clutch means above a predetermined minimum speed, and means controlled by said directional current responsive means for disabling said speed responsive means.

8. A vehicle alternating current supply system comprising a dynamoelectric machine having direct and alternating current output terminals, a battery having a charging circuit permanently connected to said direct current terminals, said battery alternatively supplying current to drive said dynamoelectric machine and being charged therefrom, clutch means arranged to connect said dynamoelectric machine to be driven by said vehicle, means responsive to the speed of said vehicle for energizing said clutch means to connect said dynamoelectric apparatus to be driven by said vehicle, and directional current responsive means associated with said charging circuit for disabling said speed responsive means and energizing said clutch means directly from said battery whenever charging current is flowing to said battery.

9. In combination, a variable speed dynamoelectric machine having alternating current output terminals, a load circuit connected to said terminals, a saturable reactor connected across said load circuit, and means for regulating the output voltage of said machine comprising means responsive to at least a portion of said voltage for controlling the saturation of said reactor.

10. In combination, a variable speed dynamoelectric machine having alternating current output terminals, a load circuit connected to said terminals, a saturable reactor connected across said load circuit, and means for controlling the output voltage of said machine comprising rectifying means responsive to a characteristic of the voltage applied to said load circuit for controlling the direct current saturation of said reactor.

11. In combination, a variable speed dynamoelectric machine having alternating current output terminals, a load circuit connected to said terminals, a saturable reactor connected across said load circuit, and means for maintaining substantially constant an electrical characteristic of said load circuit comprising means responsive to said characteristic for controlling the unidirectional saturation of said reactor.

12. In combination, a variable speed dynamoelectric machine having alternating current output terminals, a load circuit connected to said terminals, a saturable reactor connected across said load circuit and provided with a direct current saturating winding, a source of unidirectional current supply connected to said saturating winding, and means responsive to at least a portion of the voltage across said load circuit for controlling the current in said saturating winding to oppose changes in the output voltage of said machine.

13. In combination, a variable speed dynamoelectric machine having alternating current output terminals, a load circuit connected to said terminals, a saturable reactor connected across said load circuit and provided with a direct current saturating winding, a source of unidirectional current supply connected to said saturating winding, and means for regulating an electrical characteristic of said load circuit comprising means responsive to said characteristic for controlling the current in said saturating winding directly in accordance with variation of said characteristic.

14. In combination, a variable speed dynamoelectric machine having alternating current output terminals, a load circuit connected to said terminals, a saturable reactor connected directly across said output terminals and having a direct current saturating winding, a source of unidirectional current supply for said saturating winding, and means for controlling the current in said saturating winding in response to the voltage between said terminals thereby to maintain said voltage substantially constant.

15. In combination, a variable speed dynamoelectric machine having alternating current output terminals, a load circuit connected to said output terminals and including a load element connected in series circuit relation with an inductive reactor, means for maintaining the inductive reactance of said reactor substantially independent of supply frequency, and means for maintaining the voltage across said load element substantially constant.

16. In combination, a variable speed dynamoelectric machine having alternating current output terminals, a load circuit connected to said output terminals and including a load element connected in series circuit relation with a saturable reactor, means for controlling the saturation of said reactor to render its inductive reactance substantially independent of frequency, a second saturable reactor connected across said load circuit, and means for regulating the voltage across said load element comprising means responsive to said voltage for controlling the saturation of said second saturable reactor.

17. In combination, a variable speed dynamoelectric machine having alternating current output terminals, a load circuit connected to said terminals and including a load element connected in series circuit relation with a saturable reactor having a direct current saturating winding, means responsive to supply frequency for controlling the current in said winding directly in accordance with said frequency, a second saturable reactor connected directly across said output terminals and having a second direct current saturating winding, a source of unidirectional current supply for said second saturating winding, and means responsive to the voltage across said load element for controlling the current in said second saturating winding directly in accordance with said voltage.

18. A variable speed dynamoelectric machine having a common armature provided with alternating current and direct current output terminals, a battery permanently connected to said direct current output terminals to be charged by said machine, means for regulating the alternating current output voltage and controlling the charging of said battery comprising a saturable reactor connected between said alternating current terminals, and means responsive to at least a portion of the alternating current output voltage of said machine for controlling the saturation of said reactor.

19. A variable speed dynamoelectric machine having a common armature provided with alternating current and direct current output terminals, a battery permanently connected to said direct current output terminals to be charged by said machine, a load circuit connected to said alternating current output terminals, voltage regulating means comprising a saturable reactor connected across said load circuit, and means responsive to at least a portion of the voltage across said load circuit for controlling the reactance of said reactor thereby to control both the direct current and alternating current output voltage of said machine by armature reaction.

20. In combination, a variable frequency alternating current supply source, a load circuit connected to said source and including a saturable reactor, and means for maintaining the inductive reactance of said reactor substantially constant comprising means responsive to the frequency of said supply source for controlling the saturation of said reactor.

21. In combination, a variable frequency alternating current supply source, a load circuit connected to said source and including a saturable reactor, and means for rendering the inductive reactance of said reactor substantially independent of frequency comprising a resonant circuit tuned to a frequency without the frequency range of said supply source and arranged to control the saturation of said reactor.

22. In combination, a variable frequency alternating current supply source, a load circuit connected to said source and including a saturable reactor having a direct current saturating winding, a series resonant circuit connected to said supply source and tuned to a frequency above the frequency range of said supply source, and means for controlling the current in said saturating winding directly in accordance with the current in said resonant circuit.

23. In combination, a variable frequency alternating current supply source, a load circuit connected to said supply source and including a saturable reactor having a direct current saturating winding, a resonant circuit connected to said source and tuned to a frequency without the frequency range of said supply source, and rectifier means associated with said resonant circuit and connected to supply direct current to said winding.

24. In combination, a variable speed alternating current dynamoelectric machine, a load circuit connected to said machine and including a load element connected in series circuit relation with a saturable reactor having a direct current saturating winding, voltage regulating means for maintaining substantially constant the voltage across said load element, and a rectifier connected in series circuit relation with a capacitor across said load element for controlling the current in said saturating winding to maintain the inductive reactance of said reactor substantially independent of frequency.

GEORGE H. FLETCHER.

REFERENCES CITED

The following references are of record in the file of this patent:

UNITED STATES PATENTS

| Number | Name | Date |
| --- | --- | --- |
| 1,279,392 | Martinetto | Sept. 17, 1918 |
| 1,481,919 | McGill | Jan. 29, 1924 |
| 1,957,015 | Lansing | May 1, 1934 |
| 1,957,016 | Loudon | May 1, 1934 |
| 1,958,665 | Hausamann | May 15, 1934 |
| 1,981,738 | McNeil | Nov. 20, 1934 |
| 1,989,501 | Suits | Jan. 29, 1935 |
| 2,104,381 | Alexander et al. | Jan. 4, 1938 |
| 2,267,395 | Chambers | Dec. 23, 1941 |
| 2,278,151 | Runaldue | Mar. 31, 1942 |